June 18, 1935.  W. F. TRAUDT  2,005,015
APPARATUS FOR WASHING OR TREATING MATERIALS
Filed Nov. 28, 1934    2 Sheets-Sheet 1

INVENTOR
William F. Traudt
by Parker, Prochnow & Farmer
ATTORNEYS.

June 18, 1935. W. F. TRAUDT 2,005,015
APPARATUS FOR WASHING OR TREATING MATERIALS
Filed Nov. 28, 1934 2 Sheets-Sheet 2

INVENTOR
William F. Traudt
by Parker, Aschnow & Farmer
ATTORNEYS

Patented June 18, 1935

2,005,015

UNITED STATES PATENT OFFICE 2,005,015

APPARATUS FOR WASHING OR TREATING MATERIALS

William F. Traudt, Buffalo, N. Y.

Application November 28, 1934, Serial No. 755,207

11 Claims. (Cl. 141—12)

This invention relates to improvements in apparatus for washing or treating fibrous or analogous materials, particularly the filtering material employed in breweries for filtering beer and other beverages. The filtering material commonly used for clarifying such liquids, and known as "filter mass", after use in the filter presses, in which it becomes compressed or packed and clogged with impurities from the beer or liquid being filtered, is broken up and washed to remove the impurities and renovate or restore the mass to a clean, loose or fluffy condition suitable for reuse for filtering.

An object of my invention is to improve apparatus for washing, renovating or treating filter mass or analogous material to improve the performance thereof with the result of increasing the efficiency and capacity of such apparatus.

Another object of the invention is to provide a washing or treating apparatus for filter-mass and analogous material which will have the other features of improvement and advantage hereinafter described and set forth in the claims.

Figure 1:
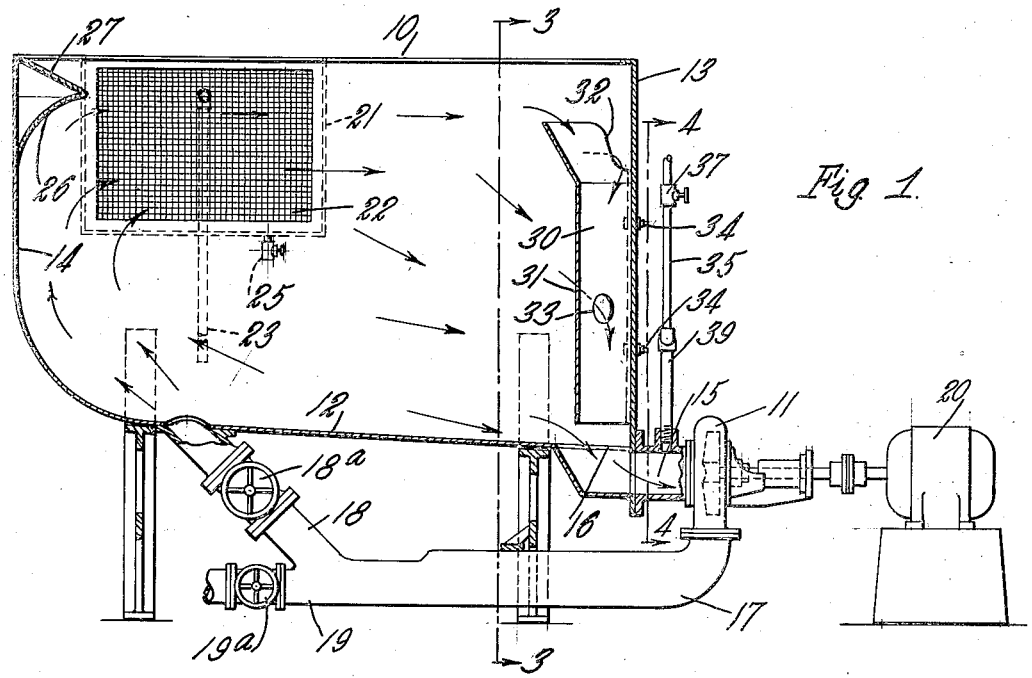
Fig. 1 is a longitudinal, sectional elevation of a washing or treating apparatus for filter-mass and analogous material embodying my invention.
Figure 2:
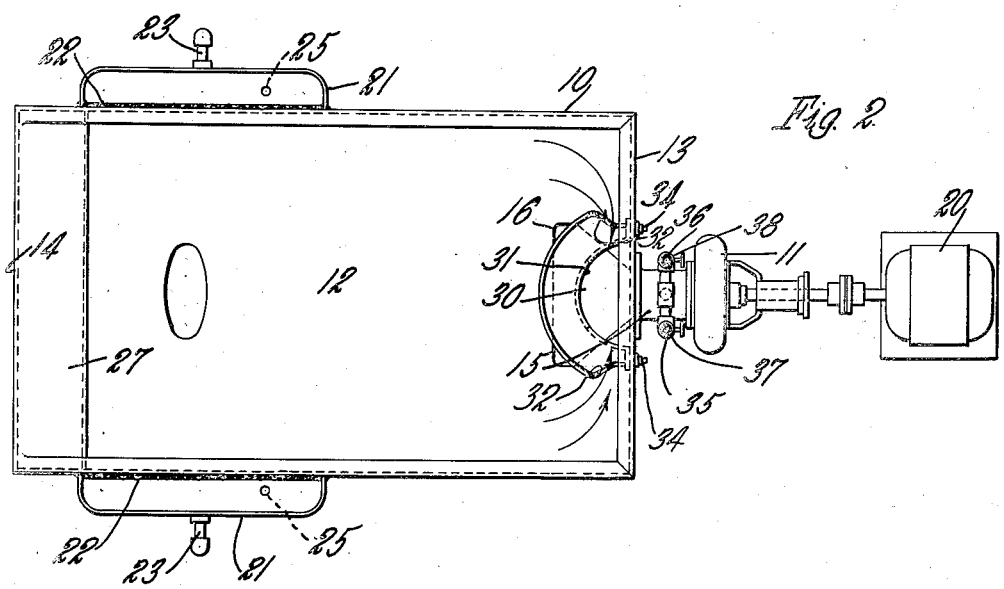
Fig. 2 is a plan view thereof.
Figure 3:
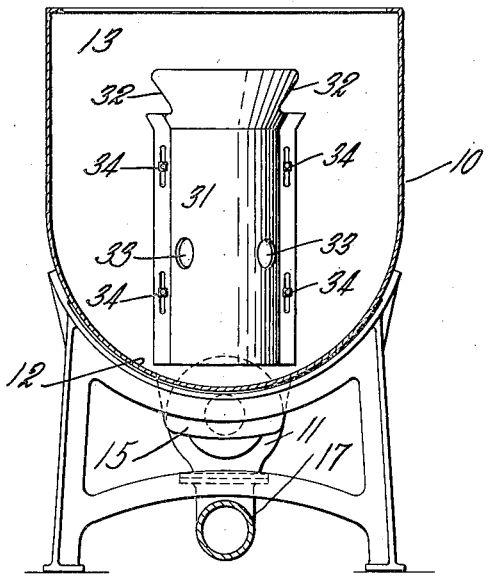
Fig. 3 is a transverse, vertical section thereof on line 3—3, Fig. 1.
Figure 4:
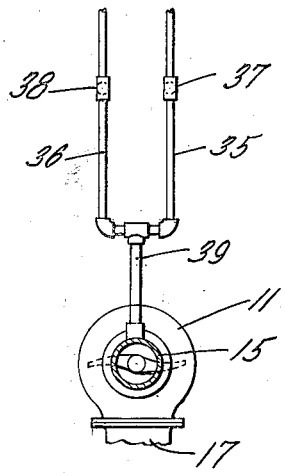
Fig. 4 is a transverse, sectional elevation thereof on line 4—4, Fig. 1.

The apparatus comprises a tank or receptacle 10 into which the material to be washed or treated and the water or washing fluid for the material are introduced, and a circulator or pump 11 which communicates by suction and discharge connections with the tank and is adapted to repeatedly circulate the material and washing fluid through the tank, pump and connections for causing an active agitation and intimate mixing of the solid material with the fluid.

The tank 10 is preferably of substantially the shape shown in the drawings, that is of rectangular section in plan, having a transversely curved or troughed bottom 12, an upright end wall 13 at the end of the tank with which the pump suction communicates, and an opposite end wall 14, the lower portion of which is curved downwardly and inwardly to its juncture with the curved bottom of the tank. The circulator 11 shown is a centrifugal pump of known non-clogging construction adapted to circulate the fluid mixture of solid and liquid materials and comprising a casing having a central inlet or suction opening at one side and a peripheral outlet, and a rotary impeller comprising two blades projecting oppositely from the impeller shaft. A suction head or connection 15 joins the pump inlet with an outlet opening 16 in the lower portion of the adjacent end of the tank. Preferably this opening is in the tank bottom and the suction connection flares or increases in diameter from the pump inlet to the tank outlet opening 16 and forms an outlet sump in the tank bottom. A discharge connection or pipe 17 extends from the pump outlet beneath the bottom of the tank and has a discharge end portion or branch 18 which preferably inclines upwardly towards and communicates with the tank by a discharge opening in the bottom of the tank approximately at the inner end of the curved lower portion of the end 14 of the tank. The inclined portion 18 of the discharge pipe is more or less tangential to the curved lower portion of the end 14, so that the discharge from the pipe into the tank will be approximately in the direction of the curved lower portion of the end wall 14 of the tank. As shown, the discharge pipe has a branch 19 extending away from the tank for delivering or conveying the finished material from the tank to the desired place or container (not shown). Valves 18a and 19a in the branches 18 and 19 enable either branch to be opened and the other closed for the purpose of either circulating the fluid mixture through the tank or for conveying it therefrom.

The circulator pump may be driven by an electric motor 20, or other drive means.

At its upper portion, preferably at its opposite sides, the tank is provided with overflow boxes or chambers 21 which communicate with the interior of the tank through openings in the side walls of the tank covered by statically balanced overflow screens 22. The washing fluid passing from the tank through these screens is adapted to overflow from the boxes 21 through suitable overflow pipes 23 which communicate with the overflow boxes near their upper portions by outlet openings 24. Each overflow box is also preferably provided at its bottom with a valve-controlled drain or clean-out pipe 25 which is kept closed during the operation of the apparatus.

Within the tank 10 at the far end thereof from the circulator is a deflector 26 which is preferably curved from the connection of its lower end with the end wall 14 of the tank upwardly and inwardly and is so positioned that its inner, upper edge is approximately tangential to the horizontal plane of the outlet openings 24 of the overflow pipes, so that the liquid mixture which is caused to move upwardly along the curved lower portion of the end 14 of the tank, by the discharge of the circulator into the bottom of the tank, will be directed by this deflector 26 forwardly in the upper portion of the tank and produce a rapidly moving, forward current or flow of the surface and upper portions of the fluid mixture in the tank. The deflector 26 may be, as shown, formed by a bent plate, the upper portion 27 of which extends from the inner end of the curved deflector back to the end wall 14 of the tank to which it may be welded or otherwise suitably secured.

In the forward end of the tank having the outlet opening 16 is formed an upright passage 30 which opens at its upper and lower ends into the tank with its lower end opposite and adjacent the tank outlet opening 16. This passage is preferably formed by an upright curved or U-shaped baffle 31 having side walls secured to the end wall 13 of the tank. The open lower end of this baffle is spaced above the bottom of the tank and its open upper end terminates below the normal level of the fluid mixture in the tank, so that the pump can draw the mixture from the tank both through the passage 30 formed by this baffle and also directly beneath the lower end of the baffle.

Preferably, the upper end of the baffle is enlarged or flaring and the side walls of its upper end are cut away or provided with side openings 32, below the highest part of its top edge, and in addition, the baffle 30 is also provided between its ends, preferably about its mid-height, with one or more inlet openings 33. Thus, the fluid mixture which is drawn by the pump from the tank through the outlet opening 16 can pass on its way to the outlet opening partly beneath the baffle 31 and partly through the passage 30, entering the passage over its flaring upper edge, and also through the upper side openings 32 and the intermediate openings 33. The baffle 31 is also arranged so as to be capable of vertical adjustment in the tank, for which purpose, as shown, it is secured to the end wall of the tank by bolts 34 which pass through vertically elongated slots in the flanged edges of the side walls of the baffle and are secured in holes in the end wall 13 by outside nuts with suitable packings to prevent leakage from the tank.

35 and 36 represent respectively cold and hot water or steam supply pipes equipped with suitable supply regulating valves 37 and 38 and preferably connected, as by an end pipe 39, with the suction connection 15, so that water at suitably regulated, required temperatures can be supplied to the material circulated by the pump or circulator 11 before the entrance of the material into the pump, thereby ensuring a thorough mixing of the water with the material.

In the operation of the apparatus for washing the material, the filter-mass or material is introduced into the tank and the tank filled to the level of the overflow outlets 24 with the water or washing fluid, which may be supplied through the pipes 35 and 36, and the pump or circulator is set in operation. The pump or circulator draws the fluid mixture from the tank through the suction connection 15 and discharges it into the tank through the discharge connection 18, thus continuously circulating the fluid mixture through the tank, pump, suction and discharge connections. The supply of the water or washing fluid is continued during the washing operation, and the soiled water will overflow through the screened side openings 22 and overflow pipes 23. During the washing operation, the fluid mixture will circulate from the discharge connection 18 upwardly in a rear end of the tank, and will be deflected by the deflector 26 forwardly in the tank past the screened overflow openings 22 toward the front end of the tank, and will pass to the pump suction connection 15 directly and also through the upper end, and the openings 32 and 33 of the baffle passage 30, so that there will be an active turbulence or movement throughout the body of the mixture in the tank, that is, in its lower, upper and middle portions, as indicated by the arrows in Fig. 1. The upper side openings 32 of the baffle admit the fluid mixture from the forward portions of the tank at opposite sides of the baffle and thus prevent dead or stagnant areas in the front side corners of the tank which would otherwise occur. An improved operation is caused by the curved baffle 26 directing the mixture forward at a greater velocity than in previous constructions, and this greater velocity increases the actual circulation of the mixture in the tank. This greater velocity also causes the overflow screens on each side of the tank to be swept clear; that is, no mass adheres to them, and thus a greater amount of washing water can be used because it flows over freer from the statically balanced overflow screens. Thereby, the time of washing is reduced, by quicker dilution, because of the greater amount of water that is carried through the screens due to the higher velocity at which the mass is caused to flow by.

By suitable vertical adjustment of the baffle 31 in the tank, depending upon the quantity of the filter-mass material being treated and consequently the density of the fluid mixture, more or less of the mixture can be caused to pass to the suction connection of the pump beneath or through the upper end of the baffle passage 30, thus regulating the proportions of the lighter or less dense upper strata and the denser, lower strata of the mixture drawn from the tank by the pump, and insuring a more uniform action throughout the whole body of the fluid mixture.

I claim as my invention:

1. An apparatus for washing materials comprising a tank adapted to contain the material in a fluid mixture, means for supplying the washing fluid to the tank, a circulator for the fluid mixture having a suction connection opening into the tank adjacent one end thereof, and a discharge connection arranged to discharge into the lower portion of the tank toward its opposite end, a deflector extending across and upwardly and inwardly from said last mentioned end of the tank, whereby the fluid mixture is deflected upwardly and inwardly and caused to flow away from said end lengthwise in the upper portion of the tank, an overflow chamber communicating with said tank by an opening covered by a stationary screen and located between said suction and discharge connections and past which the fluid mixture flows, and an overflow outlet for discharging to waste the soiled fluid from said overflow chamber located approximately in a horizontal plane tangential to the upper edge of said deflector.

2. An apparatus for washing materials comprising a tank adapted to contain the material in a fluid mixture, means for supplying the washing fluid to the tank, a circulator for the fluid mixture located outside of said tank and having a suction connection opening into the tank adjacent one end thereof, and a discharge connection arranged to discharge into the lower portion of the tank toward its opposite end, a deflector curving upwardly and inwardly from said last mentioned end of the tank, whereby the fluid mixture is deflected upwardly and inwardly and caused to flow away from said end lengthwise in the upper portion of the tank, overflow chambers at the opposite sides of the tank and communicating therewith through screen openings, and outlet openings from said overflow chambers located approximately in a horizontal plane tangential to the upper edge of said curved deflector.

3. An apparatus for washing materials comprising a tank adapted to contain the material in a fluid mixture and having an end wall with a lower portion curving downwardly and inwardly to the bottom of the tank, means for supplying the washing fluid to the tank, a circulating pump for the fluid mixture having a suction connection opening into the opposite end of the tank from said end wall, and a discharge connection arranged to discharge into the lower portion of the tank approximately tangentially to said curved lower portion of said end wall, a deflector curving upwardly and inwardly in the tank from said end wall, and an overflow opening at the side of the tank forwardly of said deflector and located approximately in a horizontal plane tangential to the upper edge of said deflector.

4. An apparatus for washing materials comprising a tank adapted to contain the material in a fluid mixture, means for supplying the washing fluid to the tank, a circulator for the fluid mixture which is located outside of the tank and through which the mixed fluid and solid material pass and which has a suction connection opening into the tank adjacent one end thereof, and a discharge connection arranged to discharge into the lower portion of the tank, means for producing a motion of the fluid mixture in the tank toward said suction connection, and a baffle in said tank forming an upright fluid passage communicating with said suction connection and opening at its upper and lower ends and also between its ends into the tank.

5. An apparatus for washing materials comprising a tank adapted to contain the material in a fluid mixture, means for supplying the washing fluid to the tank, a circulator for the fluid mixture having a suction connection opening into the tank adjacent one end thereof, and a discharge connection arranged to discharge into the lower portion of the tank, means for producing a motion of the fluid mixture in the tank toward said suction connection, a baffle in said tank forming an upright fluid passage communicating with said suction connection and opening at its upper and lower ends and also between its ends into the tank, and means for adjusting said baffle to different elevations in the tank.

6. An apparatus for washing materials comprising a tank adapted to contain the material in a fluid mixture, means for supplying the washing fluid to the tank, a circulator for the fluid mixture which is located outside of the tank and through which the mixed fluid and solid material pass and which has a suction connection opening into the tank adjacent one end thereof, and a discharge connection arranged to discharge into the lower portion of the tank, means for causing motion of the fluid mixture in the tank toward said suction connection, and a baffle in the tank forming an upright passage communicating with said suction connection and communicating at its upper and lower ends with the tank, and said passage opening laterally into said tank at opposite sides of its upper portion.

7. An apparatus for washing materials comprising a tank adapted to contain the material in a fluid mixture, means for supplying the washing fluid to the tank, a circulator for the fluid mixture which is located outside of the tank and through which the mixed fluid and solid material pass and which has a suction connection opening into the tank adjacent one end thereof, and a discharge connection arranged to discharge into the lower portion of the tank, means for causing motion of the fluid mixture in the tank toward said suction connection, and a baffle in the tank forming an upright passage communicating with said suction connection and opening into said tank at its upper end and also intermediate of its ends, and said passage also opening laterally into the tank at opposite sides of its upper portion.

8. An apparatus for washing materials comprising a tank adapted to contain the material in a fluid mixture, means for supplying the washing fluid to the tank, a circulator for the fluid mixture having a suction connection opening into the tank adjacent one end thereof, and a discharge connection arranged to discharge into the lower portion of the tank, means for causing motion of the fluid mixture in the tank toward said suction connection, and an approximately U-shaped upright baffle in said tank having side walls joining the adjacent end wall of the tank at opposite sides of said suction connection, said baffle being submerged in the fluid mixture with its lower end spaced from the bottom of the tank, and said baffle having openings in the upper portions of its side walls.

9. An apparatus for washing materials comprising a tank adapted to contain the material in a fluid mixture, means for supplying the washing fluid to the tank, a circulator for the fluid mixture having a suction connection opening into the tank adjacent one end thereof, and a discharge connection arranged to discharge into the lower portion of the tank, means for causing motion of the fluid mixture in the tank toward said suction connection, and an approximately U-shaped upright baffle in said tank having side walls joining the adjacent end wall of the tank at opposite sides of said suction connection, said baffle being submerged in the fluid mixture with its lower end spaced from the bottom of the tank, and having openings in the upper portions of its side walls and also having an opening between its ends.

10. An apparatus for washing materials comprising a tank adapted to contain the material in a fluid mixture, means for supplying the washing fluid to the tank, a circulator for the fluid mixture located outside of the tank and having a suction connection opening into the tank adjacent one end thereof, and a discharge connection arranged to discharge into the lower portion of the tank toward its opposite end, a deflector curving upwardly and inwardly from said last mentioned end of the tank, and an upright baffle in the tank having solid side walls extending to the end of the tank at opposite sides of said suction connection, said baffle forming an upright passage communicating with the suction connection and opening into the tank at its upper and lower ends.

11. An apparatus for washing materials comprising a tank adapted to contain the material in a fluid mixture, means for supplying the washing fluid to the tank, a circulator for the fluid mixture located outside of the tank and having a suction connection opening into the tank adjacent one end thereof, and a discharge connection arranged to discharge into the lower portion of the tank toward its opposite end, a deflector curving upwardly and inwardly from said last mentioned end of the tank, and an upright baffle in the tank having solid side walls extending to the end of the tank at opposite sides of said suction connection, said baffle forming an upright passage communicating with the suction connection and opening into the tank at its upper and lower ends and also between its upper and lower ends.

WILLIAM F. TRAUDT.